United States Patent
Kishima

(10) Patent No.: US 10,457,335 B2
(45) Date of Patent: Oct. 29, 2019

(54) VEHICULAR MUD GUARD STRUCTURE

(71) Applicant: TOYOTA JIDOSHA KABUSHIKI KAISHA, Toyota-shi, Aichi-ken (JP)

(72) Inventor: Fumihiko Kishima, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/046,489

(22) Filed: Jul. 26, 2018

(65) Prior Publication Data

US 2018/0327034 A1 Nov. 15, 2018

Related U.S. Application Data

(63) Continuation of application No. 14/649,409, filed as application No. PCT/JP2013/079463 on Oct. 30, 2013, now Pat. No. 10,065,686.

(30) Foreign Application Priority Data

Dec. 3, 2012 (JP) ................... 2012-264646

(51) Int. Cl.
*B62D 25/18* (2006.01)
*B62D 35/02* (2006.01)

(52) U.S. Cl.
CPC .............. *B62D 25/18* (2013.01); *B62D 35/02* (2013.01); *Y02T 10/88* (2013.01)

(58) Field of Classification Search
CPC .... B62D 25/16; B62D 25/161; B62D 25/163; B62D 25/168; B62D 25/18; B62D 25/182; B62D 25/186; B62D 25/188; B62D 35/02
See application file for complete search history.

(56) References Cited

U.S. PATENT DOCUMENTS 3,341,222 A  9/1967 Roberts
3,834,732 A  9/1974 Schons
(Continued)

FOREIGN PATENT DOCUMENTS

JP  S64-008480 U1  1/1989
JP  H11-301521 A  11/1999
(Continued)

OTHER PUBLICATIONS

Jan. 7, 2016 Office Action Issued in U.S. Appl. No. 14/649,409.
(Continued)

*Primary Examiner* — Frank B Vanaman
(74) *Attorney, Agent, or Firm* — Oliff PLC

(57) ABSTRACT

A mud guard portion is placed on a vehicle rear side relative to a rear tire. This makes it possible to restrain mud or the like splashed by the rear tire from hitting an underfloor. Further, an inside flow regulating portion is provided adjacently to an inner side of the mud guard portion in the vehicle width direction, and the inside flow regulating portion extends from its upper end toward a vehicle lower side and toward the vehicle rear side. Hereby, when a travel wind flowing on an inner side of the rear tire in the vehicle width direction in the wheel house hits the inside flow regulating portion, the travel wind flows toward the vehicle rear side along a deflection wall portion of the inside flow regulating portion. Accordingly, turbulence of the air on a vehicle rear side of the rear tire due to the travel wind is restrained.

3 Claims, 19 Drawing Sheets

(56) References Cited

U.S. PATENT DOCUMENTS

| | | | |
|---|---|---|---|
| 4,192,522 A * | 3/1980 | Morgan | B62D 25/168 |
| | | | 280/851 |
| 4,334,694 A | 6/1982 | Iwanicki | |
| 4,372,570 A | 2/1983 | Goodall | |
| 5,207,455 A | 5/1993 | Gotz et al. | |
| 5,820,203 A * | 10/1998 | Morelli | B60C 23/18 |
| | | | 296/180.1 |
| 5,839,761 A * | 11/1998 | Dodt | B60C 19/002 |
| | | | 280/851 |
| 5,961,148 A | 10/1999 | Cheng | |
| 2004/0026914 A1 * | 2/2004 | Jain | B62D 25/161 |
| | | | 280/848 |
| 2010/0156142 A1 | 6/2010 | Sumitani et al. | |
| 2011/0248490 A1 | 10/2011 | Downes et al. | |
| 2012/0112447 A1 | 5/2012 | Stidsen | |

FOREIGN PATENT DOCUMENTS

| | | |
|---|---|---|
| JP | 2002-326586 A | 11/2002 |
| JP | 2008-105653 A | 5/2008 |
| JP | 2011-031700 A | 2/2011 |

OTHER PUBLICATIONS

Dec. 9, 2016 Office Action Issued in U.S. Appl. No. 14/649,409.
Apr. 19, 2017 Office Action Issued in U.S. Appl. No. 14/649,409.
Aug. 14, 2017 Office Action Issued in U.S. Appl. No. 14/649,409.
Jan. 26, 2018 Office Action Issued in U.S. Appl. No. 14/649,409.
Jun. 8, 2016 Office Action Issued in U.S. Appl. No. 14/649,409.
U.S. Appl. No. 14/649,409 filed Jun. 3, 2015 in the name of Kishima et al.

* cited by examiner

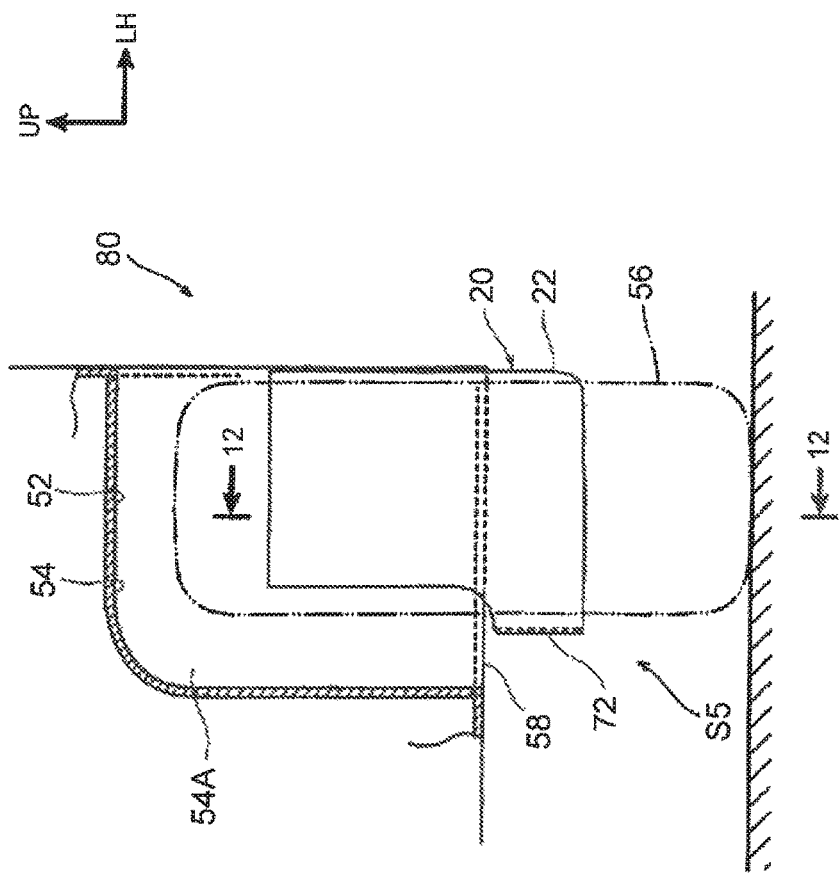

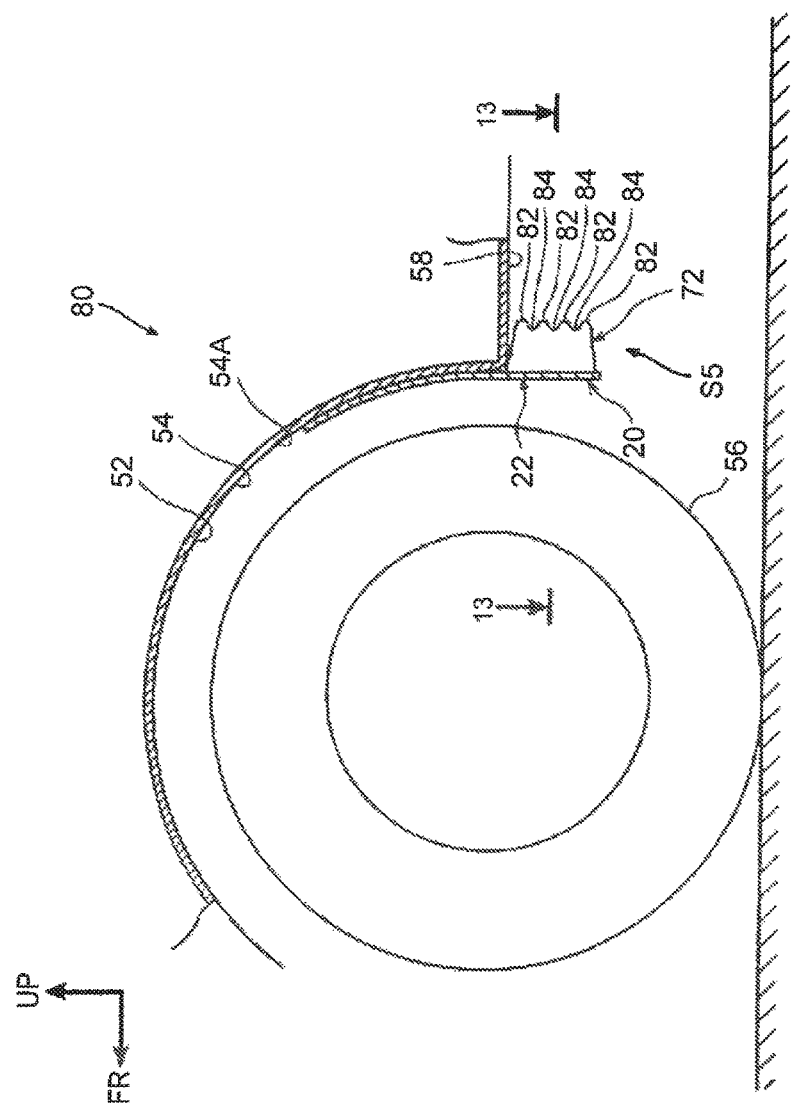

FIG. 18B
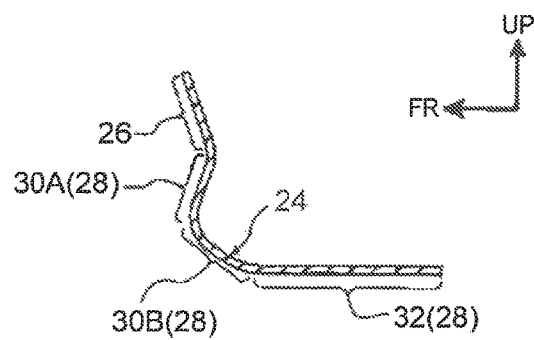
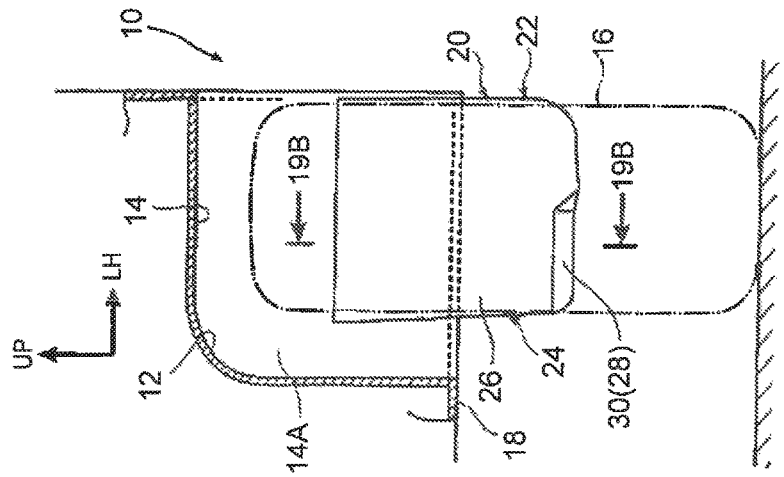

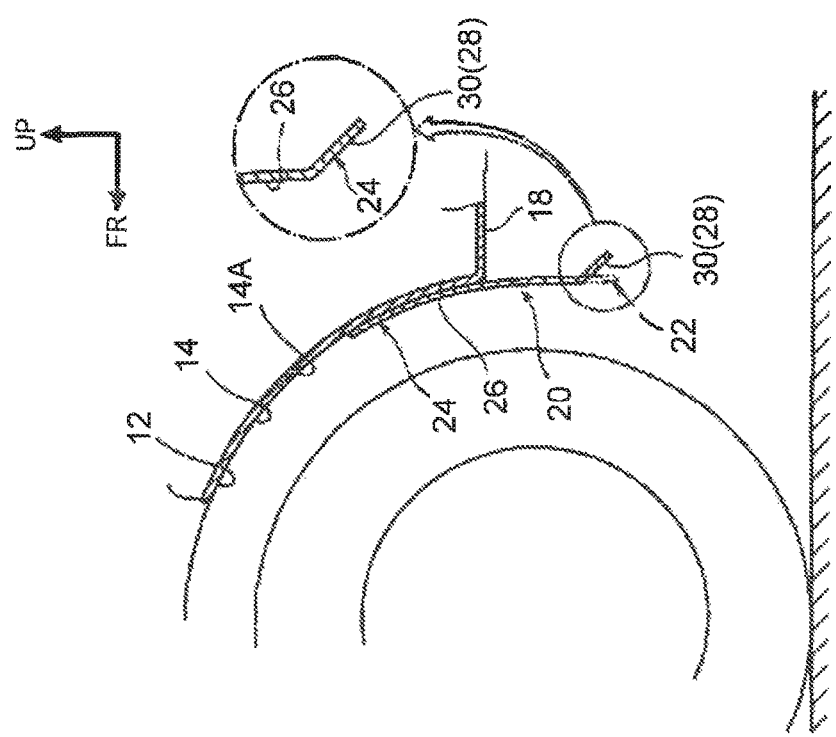

VEHICULAR MUD GUARD STRUCTURE

This is a Continuation of application Ser. No. 14/649,409 filed Jun. 3, 2015, which is a National Stage of International Application No. PCT/JP2013/079463 filed Oct. 30, 2013, which claims the benefit of Japanese Application No. 2012-264646 filed Dec. 3, 2012. The disclosures of the prior applications are hereby incorporated by reference herein in their entireties.

TECHNICAL FIELD

The present invention relates to a vehicular mud guard structure.

BACKGROUND ART

In a vehicle body vibration control structure described in Patent Document 1, a mud guard is attached to a rear end of a front wheel house. The mud guard is formed generally in a rectangular plate shape and is placed with its plate-thickness direction extending generally along a vehicle front-rear direction. This restrains mud, water, or the like splashed by a tire from hitting a vehicle body panel.

CITATION LIST

Patent Documents

Patent Document 1: Japanese Patent Application Publication No. 2002-326586 (JP 2002-326586 A)
Patent Document 2: Japanese Utility Model Application Publication No. 64-8480 (JP 64-8480 U)

SUMMARY OF THE INVENTION

Problem to be Solved by the Invention

However, in the mud guard, since a travel wind that hits the mud guard flows toward a vehicle lower side, the air on a vehicle rear side of the tire might be disturbed.

The present invention has been accomplished in consideration of the above fact, and is intended to provide a vehicular mud guard structure which secures a function as a mud guard and which can restrain turbulence of the air on a vehicle rear side of a wheel assembly.

Means for Solving the Problem

A vehicular mud guard structure according to a first aspect of the present invention includes: a mud guard portion provided in a rear end of a wheel house in which a wheel assembly is placed, the mud guard portion being formed in a plate shape of which width direction extends along a vehicle width direction, the mud guard portion having a lower end projecting toward a vehicle lower side relative to an underfloor on a vehicle rear side of the wheel house; and an inside flow regulating portion provided adjacently to an inner side of the mud guard portion in the vehicle width direction, the inside flow regulating portion being formed in a plate shape of which width direction extends along the vehicle width direction, the inside flow regulating portion having an upper end placed on a vehicle front side relative to the rear end of the wheel house, the inside flow regulating portion extending from the upper end toward the vehicle lower side and toward the vehicle rear side.

In the vehicular mud guard structure according to the first embodiment, the mud guard portion is provided in the rear end of the front wheel house in which the wheel assembly is placed. The mud guard portion is formed in a plate shape of which width direction extends along the vehicle width direction, and a lower end of the mud guard portion projects toward the vehicle lower side relative to an underfloor on a vehicle rear side of the wheel house. This makes it possible to restrain mud or the like splashed by the wheel assembly from hitting the underfloor on the vehicle rear side relative to the wheel assembly, for example.

Here, the inside flow regulating portion is provided adjacently to the inner side of the mud guard portion in the vehicle width direction. The inside flow regulating portion is formed in a plate shape of which width direction extends along the vehicle width direction, and an upper end of the inside flow regulating portion is placed on the vehicle front side relative to the rear end of the wheel house. The inside flow regulating portion extends from the upper end toward the vehicle lower side and toward the vehicle rear side.

Accordingly, when a travel wind (hereinafter, the travel wind is referred to as a "first travel wind") flowing on the inner side of the wheel assembly in the vehicle width direction in the wheel house hits the inside flow regulating portion, for example, the first travel wind flows toward the vehicle rear side along the inside flow regulating portion. This restrains the first travel wind from flowing toward the vehicle lower side, thereby making it possible to restrain turbulence of the air on the vehicle rear side of the wheel assembly.

Further, in a wheel house in a rear part of a vehicle, for example, when a travel wind flowing on an outer side of the vehicle in the vehicle width direction flows into the wheel house, for example, the travel wind flows diagonally downward toward an inner side in the vehicle width direction along the rear part of the wheel house (hereinafter, the travel wind is referred to as a "second travel wind"). Then, when the second travel wind flowing into the wheel house reaches the rear end of the wheel house, the second travel wind flows toward the vehicle rear side along the inside flow regulating portion. This can restrain turbulence of the air on the vehicle rear side of the wheel assembly due to the second travel wind flowing into the wheel house.

Consequently, it is possible to secure a function as a mud guard and to restrain turbulence of the air on the vehicle rear side of the wheel assembly.

A vehicular mud guard structure according to a second aspect includes: a mud guard portion provided in a rear end of a wheel house in which a wheel assembly is placed, the mud guard portion being formed in a plate shape of which width direction extends along a vehicle width direction, the mud guard portion having a lower end projecting toward a vehicle lower side relative to an underfloor on a vehicle rear side of the wheel house; and an end flow regulating portion extending from an inner part of the mud guard portion in the vehicle width direction toward the vehicle rear side.

In the vehicular mud guard structure according to the second aspect, the end flow regulating portion extends from the inner part of the mud guard portion in the vehicle width direction toward the vehicle rear side. Accordingly, the first travel wind can be flowed toward the vehicle rear side along the end flow regulating portion. Further, when the second travel wind reaches an inner part, in the vehicle width direction, of a lower end of the mud guard portion, for example, the second travel wind flows toward the vehicle rear side along the end flow regulating portion. This can restrain turbulence of the air on the vehicle rear side of the wheel assembly due to the second travel wind flowing into the wheel house.

A vehicular mud guard structure according to a third aspect includes: a mud guard portion provided in a rear end of a wheel house in which a wheel assembly is placed, the mud guard portion being formed in a plate shape of which width direction extends along a vehicle width direction, the mud guard portion having a lower end projecting toward a vehicle lower side relative to an underfloor on a vehicle rear side of the wheel house; an inside flow regulating portion provided adjacently to an inner side of the mud guard portion in the vehicle width direction, the inside flow regulating portion being formed in a plate shape of which width direction extends along the vehicle width direction, the inside flow regulating portion having an upper end placed on a vehicle front side relative to the rear end of the wheel house, the inside flow regulating portion extending from the upper end toward the vehicle lower side and toward the vehicle rear side; and an end flow regulating portion extending from an inner part of the mud guard portion in the vehicle width direction toward the vehicle rear side.

In the vehicular mud guard structure according to the third aspect, the first travel wind, for example, can be flowed toward the vehicle rear side along the inside flow regulating portion and the end flow regulating portion. Further, the second travel wind, for example, can be flowed toward the vehicle rear side along the inside flow regulating portion and the end flow regulating portion.

A vehicular mud guard structure according to a fourth aspect is configured such that, in the vehicular mud guard structure according to the first aspect or the third aspect, a part of the inside flow regulating portion is distanced from the rear end of the wheel house toward the vehicle front side, such that an inlet portion opened toward a vehicle upper side is formed between the inside flow regulating portion and the wheel house, and an rear end of the inside flow regulating portion is distanced from the underfloor toward the vehicle lower side, such that an outlet portion opened toward the vehicle rear side is formed between the rear end and the underfloor.

In the vehicular mud guard structure according to the fourth aspect, a part of the inside flow regulating portion is placed so as to be distanced toward the vehicle front side relative to the rear end of the wheel house, such that the inlet portion opened toward the vehicle upper side is formed between the inside flow regulating portion and the wheel house. Further, the rear end of the inside flow regulating portion is placed so as to be distanced toward the vehicle lower side relative to the underfloor, such that the outlet portion opened toward the vehicle rear side is formed between the rear end and the underfloor. That is, a space is formed between the inside flow regulating portion and a vehicle body (the wheel house and the underfloor), and the space communicates a space on the vehicle upper side of the inside flow regulating portion with a space on the vehicle lower side relative to the underfloor.

Accordingly, a travel wind (hereinafter, the travel wind is referred to as a "third travel wind") blowing down toward the vehicle lower side (a rear end side of the wheel house) along the rear part of the wheel house in the wheel house flows into the space between the inside flow regulating portion and the vehicle body from the inlet portion. Then, a flow of the third travel wind flowing into the space is deflected to a flow toward the vehicle rear side by the inside flow regulation portion, and then, the travel wind is discharged from the outlet portion toward the vehicle rear side. Accordingly, the travel wind can be effectively rectified toward the vehicle rear side, in regard to a vehicle in which the travel wind relatively strongly blows down along the rear part of the wheel house.

A vehicular mud guard structure according to a fifth aspect is configured such that, in the vehicular mud guard structure according to the first aspect or the third aspect, a part of the inside flow regulating portion is distanced from the rear end of the wheel house toward the vehicle front side, such that an inlet portion opened outwardly in the vehicle width direction is formed between the inside flow regulating portion and the wheel house, an rear end of the inside flow regulating portion is distanced from the underfloor toward the vehicle lower side, such that an outlet portion opened toward the vehicle rear side is formed between the rear end and the underfloor, and an inner wall extending from an inner part of the inside flow regulating portion in the vehicle width direction toward the vehicle rear side is provided.

In the vehicular mud guard structure according to the fifth aspect, a part of the inside flow regulating portion is distanced toward the vehicle front side relative to the rear end of the wheel house, such that the inlet portion opened outwardly in the vehicle width direction is formed between the inside flow regulating portion and the wheel house. Further, the inner wall extends toward the vehicle rear side from the inner part of the inside flow regulating portion in the vehicle width direction. Moreover, the rear end of the inside flow regulating portion is placed so as to be distanced toward the vehicle lower side, such that the outlet portion opened toward the vehicle rear side is formed between the rear end and the underfloor. Hereby, a space is formed between the inside flow regulating portion and the vehicle body (the wheel house and the underfloor), and the space communicates a space on an outer side of the inside flow regulating portion in the vehicle width direction with a space on the vehicle lower side relative to the underfloor.

Accordingly, when a travel wind (hereinafter, the travel wind is referred to as a "fourth travel wind") flowing on an outer side of the vehicle in the vehicle width direction flows into the wheel house from the vehicle rear side of the wheel assembly, for example, the travel wind flows through the vehicle rear side of the wheel assembly toward the inner side in the vehicle width direction, so as to flow into the space. Then, a flow of the fourth travel wind flowing into the space is deflected to a flow toward the vehicle rear side by the inner wall, and then, the travel wind flows from the outlet portion toward the vehicle rear side. Hereby, the travel wind flowing into the wheel house from the vehicle rear side of the wheel assembly can be rectified effectively toward the vehicle rear side.

A vehicular mud guard structure according to a sixth aspect is configured such that, in the vehicular mud guard structure according to the second aspect of the third aspect, a communicating hole communicating a space on the vehicle front side relative to the mud guard portion with a space on the vehicle rear side relative to the mud guard portion is formed in the end flow regulating portion, and the end flow regulating portion is opened outwardly in the vehicle width direction.

In the vehicular mud guard structure according to the sixth aspect, a travel wind (hereinafter the travel wind is referred to as a "fifth travel wind") flowing toward the inner side in the vehicle width direction along a front face of the mud guard portion at the time of turnaround of the vehicle, for example, can be flowed toward the vehicle rear side effectively. That is, if the communicating hole is not provided in the end flow regulating portion, the fifth travel wind flowing toward the inner side in the vehicle width direction along the front face of the mud guard portion at the time of turnaround of the vehicle is detached from the end flow regulating portion, which may result in that the fifth travel wind may not flow toward the vehicle rear side well. In contrast, in the vehicular mud guard structure according to the sixth aspect, since the communicating hole is formed in the end flow regulating portion, the fifth travel wind flows into a space on the vehicle rear side (a back side) of the mud guard portion through the communicating hole, such that the fifth travel wind flows toward the vehicle rear side along a rear face (a back surface) of the end flow regulating portion. This makes it possible to effectively flow, toward the vehicle rear side, the fifth travel wind flowing toward the inner side in the vehicle width direction along the front face of the mud guard portion at the time of turnaround of the vehicle.

A vehicular mud guard structure according to a seventh aspect is configured such that: in the vehicular mud guard structure according to any one of the second aspect, the third aspect, and the sixth aspect, a rear end of the end flow regulating portion is formed in an irregular shape in a side view, or a hole portion penetrating through the end flow regulating portion in its plate-thickness direction is formed in the rear end of the end flow regulating portion.

In the vehicular mud guard structure according to the seventh aspect, the rear end of the end flow regulating portion is formed in an irregular shape in a side view. That is, convex portions projecting toward the vehicle rear side and concave portions opened toward the vehicle rear side are formed in the rear end of the end flow regulating portion. Alternatively, a hole portion is formed in the rear end of the end flow regulating portion. Hereby, when a travel wind (hereinafter, the travel wind is referred to as a "sixth travel wind") flowing diagonally rearward toward the outer side in the vehicle width direction relative to the end flow regulating portion in a space on an inner side in the vehicle width direction occurs, it is possible to restrain the sixth travel wind from going around the back side of the end flow regulating portion.

That is, in a space around the end flow regulating portion during running of the vehicle, a pressure in a space on a front side of the end flow regulating portion is higher than a pressure in a space on a back side of the end flow regulating portion. Because of this, the air on the front side of the end flow regulating portion is going to flow into the back side of the end flow regulating portion through the recessed portion of a rear end of the end flow regulating portion. Alternatively, the air is going to flow into the back side of the end flow regulating portion through the hole portion of the end flow regulating portion. Hereby, a small swirl flow is caused around the rear end of the end flow regulating portion. Accordingly, a flow of the sixth travel wind that is going around the back side of the end flow regulating portion from the front side of the end flow regulating portion can be restrained by the small swirl flow. This makes it possible to restrain the sixth travel wind from going around the back side of the end flow regulating portion.

A vehicular mud guard structure according to an eighth aspect is configured such that, in the vehicular mud guard structure according to any one of the second aspect, the third aspect, and the sixth aspect, a projection portion projecting inwardly in the vehicle width direction is formed in the rear end of the end flow regulating portion.

In the vehicular mud guard structure according to the eighth aspect, the projection portion projecting inwardly in the vehicle width direction is formed in the rear end of the end flow regulating portion. Accordingly, even in this aspect, it is possible to restrain the sixth travel wind from going around the back side of the end flow regulating portion.

That is, the sixth travel wind hits the projection portion, such that an orientation of the sixth travel wind is changed toward an inner side of the projection portion in the vehicle width direction, and the sixth travel wind flows toward the vehicle rear side. This makes it possible to restrain the sixth travel wind from going around the back side of the end flow regulating portion.

Advantageous Effects of Invention

According to the vehicular mud guard structure according to the first aspect, it is possible to secure a function as a mud guard and to restrain turbulence of the air on the vehicle rear side of the wheel assembly.

According to the vehicular mud guard structure according to the second aspect, it is possible to secure a function as a mud guard and to restrain turbulence of the air on the vehicle rear side of the wheel assembly.

According to the vehicular mud guard structure according to the third aspect, it is possible to secure a function as a mud guard and to restrain turbulence of the air on the vehicle rear side of the wheel assembly.

According to the vehicular mud guard structure according to the fourth aspect, it is possible to effectively rectify the travel wind toward the vehicle rear side in regard to a vehicle in which the travel wind relatively strongly blows down along the rear part of the wheel house.

According to the vehicular mud guard structure according to the fifth aspect, it is possible to effectively rectify, toward the vehicle rear side, the travel wind flowing into the wheel house from the vehicle rear side of the wheel assembly.

According to the vehicular mud guard structure according to the sixth aspect, it is possible to effectively flow, toward the vehicle rear side, the travel wind flowing toward the inner side in the vehicle width direction along the front face of the mud guard portion at the time of turnaround of the vehicle, for example.

According to the vehicular mud guard structure according to the seventh aspect, in a case where the travel wind flowing diagonally rearward toward the outer side in the vehicle width direction occurs in the space on the inner side of the end flow regulating portion in the vehicle width direction, it is possible to restrain the travel wind from going around the back side of the end flow regulating portion.

According to the vehicular mud guard structure according to the eighth aspect, in a case where the travel wind flowing diagonally rearward toward the outer side in the vehicle width direction occurs in the space on the inner side of the end flow regulating portion in the vehicle width direction, it is possible to restrain the travel wind from going around the back side of the end flow regulating portion.

BRIEF DESCRIPTION OF THE DRAWINGS

FIG. 11 is a schematic front view illustrating an essential part of a vehicle to which a vehicular mud guard structure according to a fifth embodiment is applied, and corresponds to FIG. 3.

FIG. 12 is a schematic sectional view (a sectional view taken along a line 12-12 in FIG. 11) illustrating the essential part of the vehicle illustrated in FIG. 11 at a position of an inside flow regulating portion of a mud guard, when viewed from a vehicle left side.

FIG. 18B is a sectional side view illustrating another modification of the inclined portion of the mud guard used in the first embodiment to the third embodiment, and the sixth embodiment.

FIG. 19A is a front view illustrating a modification of the inside flow regulating portion used in the first embodiment to the third embodiment, and the sixth embodiment.

FIG. 19B is a side sectional view (a sectional view taken along a line 19B-19B in FIG. 19A) illustrating the modification of the inside flow regulating portion illustrated in FIG. 19A, when viewed from a vehicle left side.

MODES FOR CARRYING OUT THE INVENTION

First Embodiment

Figure 1:
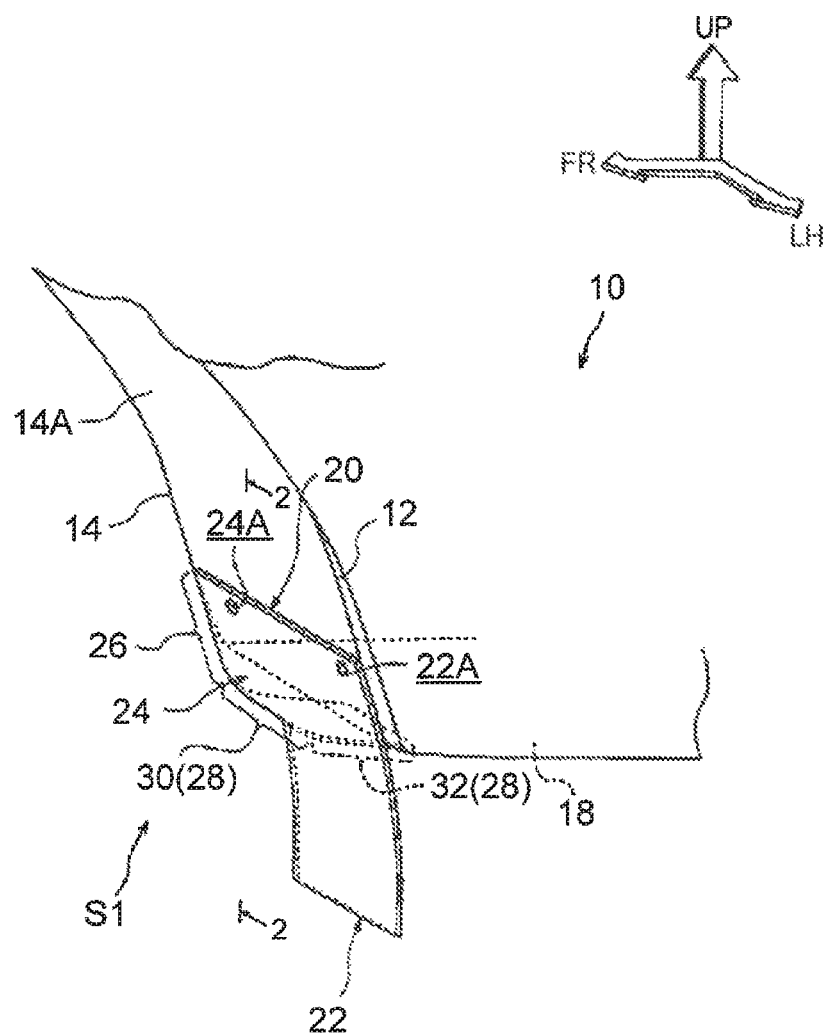
FIG. 1 is a schematic perspective view illustrating an essential part of a vehicle to which a vehicular mud guard structure according to a first embodiment is applied, when viewed from a diagonally forward left of the vehicle.
Figure 2:
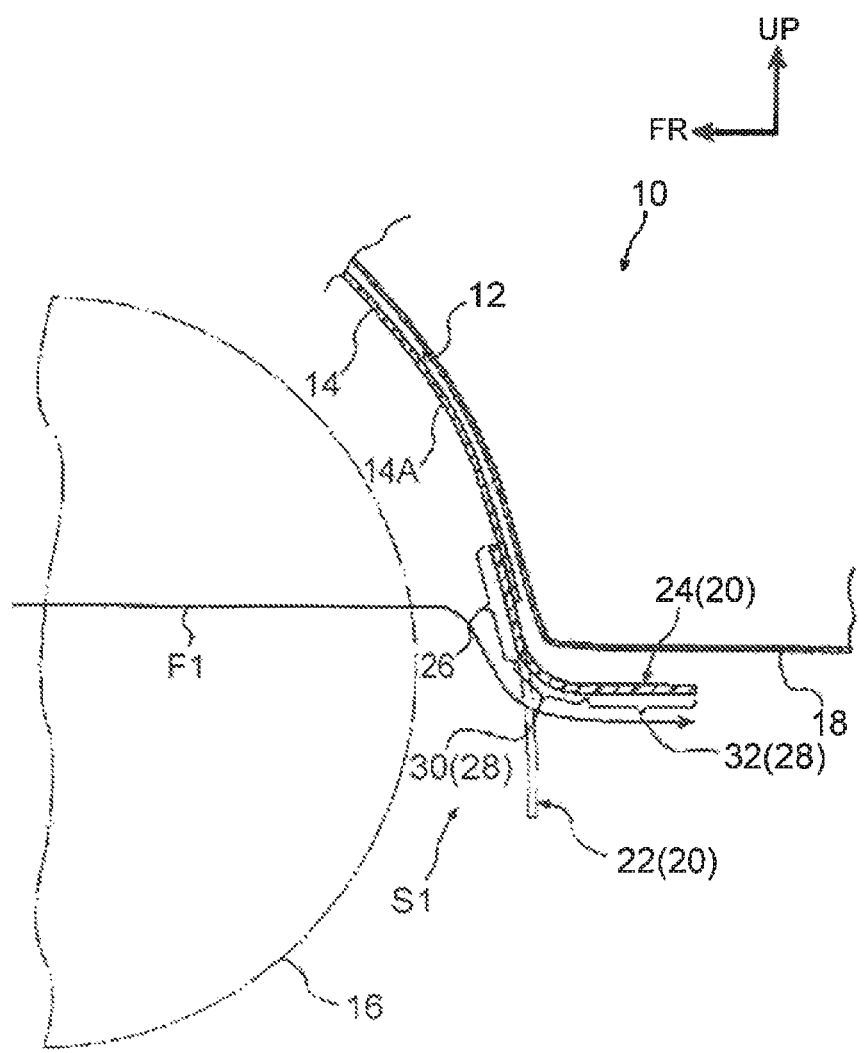
FIG. 2 is a schematic sectional view (a sectional view taken along a line 2-2 in FIG. 1) illustrating the essential part of the vehicle illustrated in FIG. 1 at a position of an inside flow regulating portion of a mud guard, when viewed from a vehicle left side.

With reference to the drawings, the following describes a vehicle 10 to which a vehicular mud guard structure S1 according to a first embodiment is applied. Further, FIG. 1 is a schematic perspective view illustrating an essential part of the vehicle 10 when viewed from a diagonally forward left of the vehicle, and FIG. 2 is a schematic sectional view (a sectional view taken along a line 2-2 in FIG. 1) of the essential part of the vehicle 10 when viewed from a vehicle left side. Note that, in the drawings, a vehicle front side is indicated by an arrow FR, a vehicle left side (one side in a vehicle width direction) is indicated by an arrow LH, and a vehicle upper side is indicated by an arrow UP.

As illustrated in the drawings, the vehicular mud guard structure S1 is applied to a rear end of a rear wheel house 12 as a wheel house placed in a rear part of the vehicle 10. Further, the vehicular mud guard structure S1 is configured in a symmetrical manner in the vehicle width direction. Accordingly, the following describes a vehicular mud guard structure S1 applied to a rear wheel house 12 on the vehicle left side of the vehicle 10, and does not describe a vehicular mud guard structure S1 applied to a rear wheel house 12 on a vehicle right side of the vehicle 10.

A fender liner 14 is provided in the rear wheel house 12. The fender liner 14 includes an arch portion 14A having a generally half cylindrical shape that is opened toward a vehicle lower side, and a rear end of the arch portion 14A extends to the rear end of the rear wheel house 12. The arch portion 14A covers an upper part of a rear tire 16 (see FIG. 2) as a wheel assembly, from a vehicle upper side.

A mud guard 20 is provided in a rear end of the arch portion 14A (the rear wheel house 12). The mud guard 20 is constituted by a mud guard portion 22 constituting an outer part of the mud guard 20 in the vehicle width direction, and an inside flow regulating portion 24 constituting an inner part of the mud guard 20 in the vehicle width direction.

The mud guard portion 22 is formed in a generally rectangular plate shape, and is placed on a vehicle rear side of the rear tire 16 of which plate-thickness direction extends generally along a vehicle front-rear direction. Further, an upper part of the mud guard portion 22 is placed on a vehicle front side of a rear end of the arch portion 14A, such that the mud guard portion 22 extends toward the vehicle lower side along the arch portion 14A. Further, a lower end of the mud guard portion 22 projects toward the vehicle lower side relative to an underfloor 18 on a vehicle rear side of the rear wheel house 12. An upper end of the mud guard portion 22 has a generally round-shaped mounting hole 22A in a penetrating manner. A fastening member such as a bolt (not shown) is inserted into the mounting hole 22A, such that the mud guard portion 22 is attached to the rear end of the arch portion 14A (the rear wheel house 12).

Figure 3:
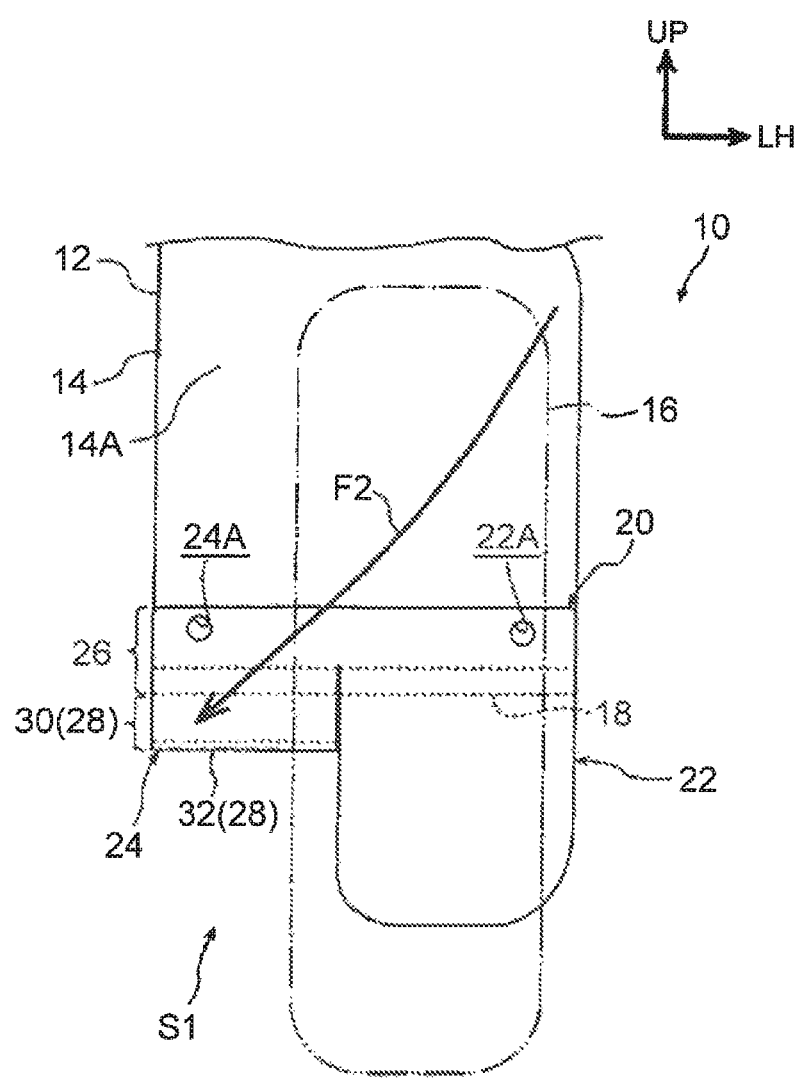
FIG. 3 is a schematic front view illustrating a rear part of a rear wheel house illustrated in FIG. 2, when viewed from a vehicle front side.

The inside flow regulating portion 24 is provided adjacently to an inner side of the mud guard portion 22 in the vehicle width direction. The inside flow regulating portion 24 is formed in a generally rectangular plate shape, and extends from an upper end of the inside flow regulating portion 24 toward the vehicle lower side and the vehicle rear side of which width direction extends along the vehicle width direction. Further, when viewed from the vehicle front side, the inside flow regulating portion 24 is placed such that its outer part in the vehicle width direction overlaps with the rear tire 16 (see FIG. 3). An upper part of the inside flow regulating portion 24 is provided as an upper wall portion 26. The upper wall portion 26 is formed integrally with an upper part of the mud guard portion 22, and is placed so as to be flush with the mud guard portion 22. That is, the mud guard 20 is configured such that the mud guard portion 22 is formed integrally with the inside flow regulating portion 24 in an upper part of the mud guard 20, and the mud guard portion 22 is separated from the inside flow regulating portion 24 in a lower part of the mud guard 20. Further, the upper wall portion 26 has a generally round-shaped mounting hole 24A in a penetrating manner. A fastening member such as a bolt (not shown) is inserted into the mounting hole 24A, such that the inside flow regulating portion 24 is attached to the rear end of the arch portion 14A (the rear wheel house 12).

Further, a lower part of the inside flow regulating portion 24 is provided as a deflection wall portion 28. The deflection wall portion 28 includes an inclined portion 30 constituting a vehicle front side part of the deflection wall portion 28, and a guide portion 32 constituting a vehicle rear side part of the deflection wall portion 28.

The guide portion 32 is placed on the vehicle lower side relative to the underfloor 18 of the vehicle 10, and is placed so as to be slightly inclined toward the vehicle lower side as it goes toward the vehicle rear side in a side view. Further, the inclined portion 30 is inclined in a curved shape (an arc shape) toward the vehicle lower side as it goes toward the vehicle rear side in a side view. The upper wall portion 26 and the guide portion 32 are connected smoothly via the inclined portion 30.

Next will be described an operation and an effect of the first embodiment.

In the vehicle 10 to which the vehicular mud guard structure S1 configured as described above is applied, the mud guard 20 is provided in the rear end of the rear wheel house 12 (the arch portion 14A of the fender liner 14), and the mud guard 20 is constituted by including the mud guard portion 22 and the inside flow regulating portion 24.

Further, the mud guard portion 22 is placed on the vehicle rear side of the rear tire 16 of which width direction extends along the vehicle width direction, and the lower end of the mud guard portion 22 projects toward the vehicle lower side relative to the underfloor 18. This allows the mud guard portion 22 to restrain mud or the like splashed by the rear tire 16 from hitting the underfloor 18, for example.

Here, the inside flow regulating portion 24 is provided adjacently to the inner side of the mud guard portion 22 in the vehicle width direction. The inside flow regulating portion 24 is formed in a plate shape of which width direction extends along the vehicle width direction, and extends from the upper end of the inside flow regulating portion 24 toward the vehicle lower side and toward the vehicle rear side.

Accordingly, when a travel wind F1 (see an arrow F1 in FIG. 2) flowing on the inner side of the rear tire 16 in the vehicle width direction in the rear wheel house 12 hits the inside flow regulating portion 24, for example, the travel wind F1 flows toward the vehicle rear side along the inside flow regulating portion 24 (the deflection wall portion 28 thereof). Hereby, the inside flow regulating portion 24 restrains turbulence of the air on the vehicle rear side of the rear tire 16 due to the travel wind F1 flowing on the inner side of the rear tire 16 in the vehicle width direction.

Further, when a travel wind F2 (see an arrow F2 in FIG. 3) flowing on an outer side of the vehicle 10 in the vehicle width direction flows into the rear wheel house 12, for example, the travel wind F2 flows diagonally downward toward the inner side in the vehicle width direction along the rear part of the rear wheel house 12 (the arch portion 14A of the fender liner 14). Then, when the travel wind F2 flowing into the rear wheel house 12 reaches the rear end of the rear wheel house 12, the travel wind F2 flows toward the vehicle rear side along the inside flow regulating portion 24 (the deflection wall portion 28 thereof). Hereby, the inside flow regulating portion 24 restrains turbulence of the air on the vehicle rear side of the rear tire 16 due to the travel wind F2 flowing into the rear wheel house 12.

Consequently, it is possible to secure a function as a mud guard and to restrain turbulence of the air on the vehicle rear side of the rear tire 16.

Second Embodiment

Figure 4:
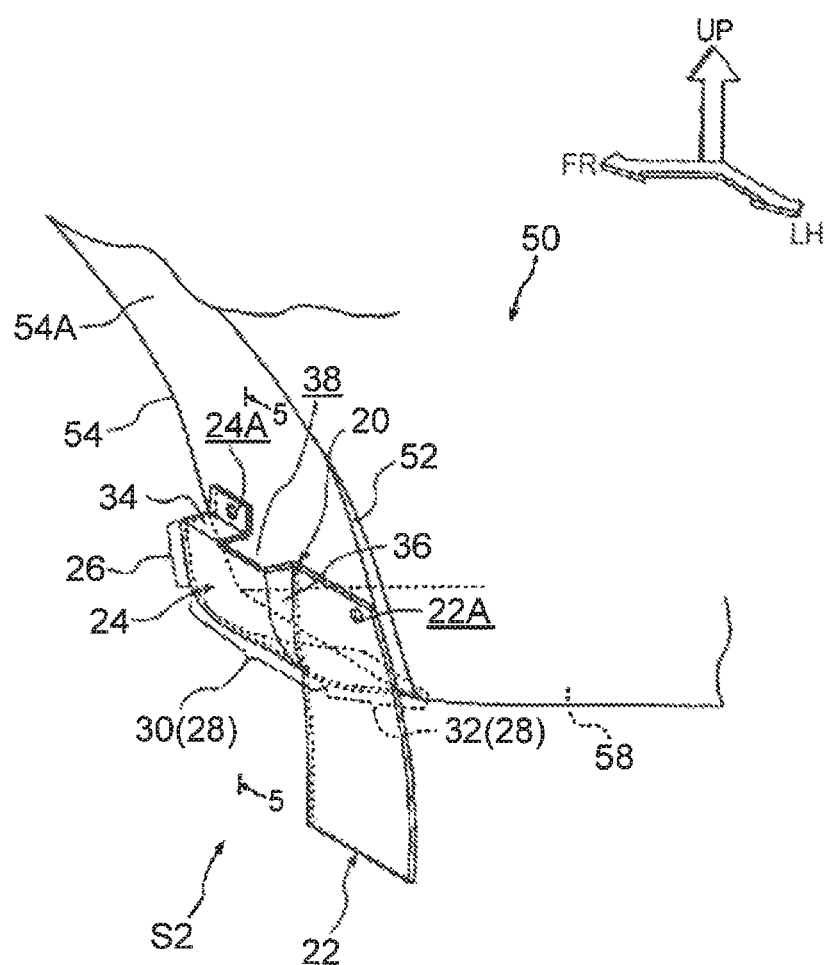
FIG. 4 is a schematic perspective view illustrating an essential part of a vehicle to which a vehicular mud guard structure according to a second embodiment is applied, when viewed from a diagonally forward left of the vehicle.
Figure 5:
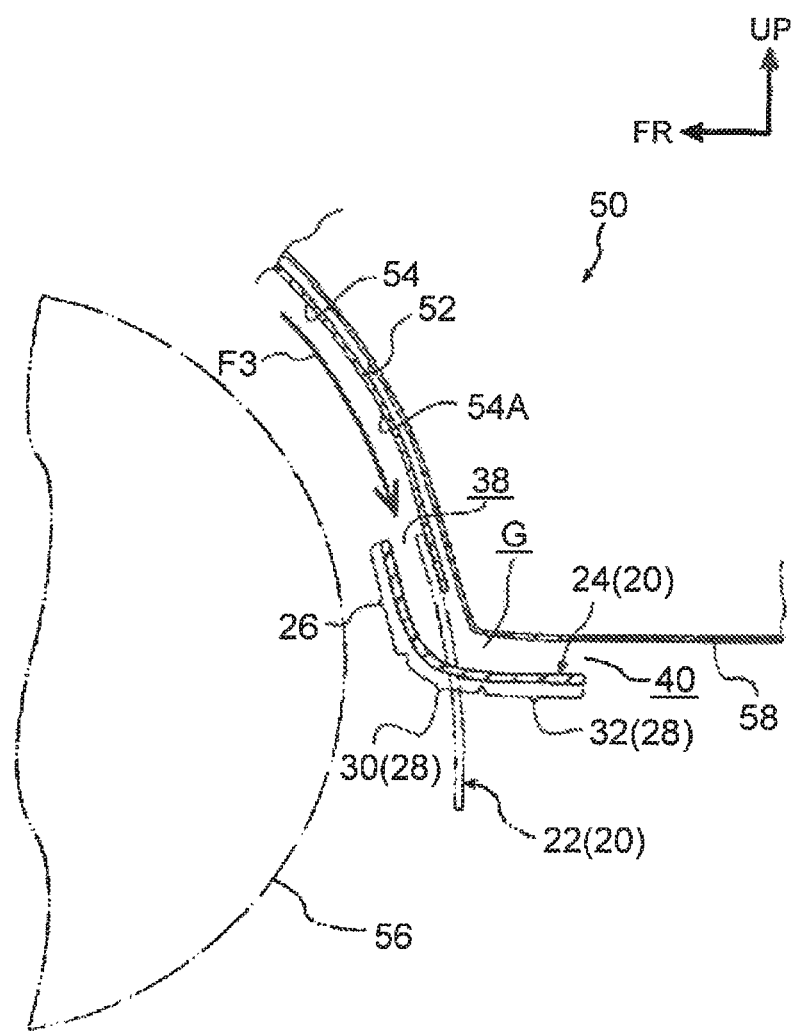
FIG. 5 is a schematic sectional view (a sectional view taken along a line 5-5 in FIG. 4) illustrating the essential part of the vehicle illustrated in FIG. 4 at a position of an inside flow regulating portion of a mud guard, when viewed from a vehicle left side.

With reference to FIGS. 4, 5, the following describes a vehicle 50 to which a vehicular mud guard structure S2 according to a second embodiment is applied. The second embodiment is configured similarly to the first embodiment except the shape of the inside flow regulating portion 24 of the mud guard 20 in the first embodiment. Further, the vehicular mud guard structure S2 according to the second embodiment is applied to a rear end of a front wheel house 52 as a wheel house placed in a front part of the vehicle 50. The following describes a configuration of the front wheel house 52, and subsequently, a shape of an inside flow regulating portion 24 is described. Note that the same reference sign is attached to a member configured in a similar manner to the first embodiment.

A fender liner 54 is provided in the front wheel house 52. The fender liner 54 includes an arch portion 54A having a generally half cylindrical shape that is opened toward the vehicle lower side, and a rear end of the arch portion 54A extends to the rear end of the front wheel house 52. Further, an upper part of a front tire 56 (see FIG. 5) as a wheel assembly is covered with the arch portion 54A covers from the vehicle upper side. A mud guard 20 is provided in a rear end of the arch portion 54A (the front wheel house 52), and a lower end of the mud guard portion 22 in the mud guard 20 projects toward the vehicle lower side relative to an underfloor 58 on a vehicle rear side of the front wheel house 52.

In the meantime, an upper wall portion 26 of the inside flow regulating portion 24 of the mud guard 20 is placed so as to be distanced toward a vehicle front side relative to a rear end of the front wheel house 52 (the arch portion 54A of the fender liner 54), and is placed so as to be slightly inclined toward the vehicle rear side as it goes toward the vehicle lower side. That is, a part of the inside flow regulating portion 24 is distanced from the rear end of the front wheel house 52 (the arch portion 54A) toward the vehicle front side, and is placed on the vehicle front side relative to the mud guard portion 22. Further, the guide portion 32 of the inside flow regulating portion 24 is placed so as to be distanced toward the vehicle lower side relative to the underfloor 58. Hereby, a space G (see FIG. 5) is formed between the inside flow regulating portion 24 and a vehicle body (the fender liner 54 and the underfloor 58).

Further, as illustrated in FIG. 4, an attachment piece 34 having a generally L-shaped plate shape is formed integrally with an upper end of the upper wall portion 26 in its inner part in the vehicle width direction. The attachment piece 34 projects from the upper end of the upper wall portion 26 toward the vehicle rear side and is bent toward the vehicle upper side. Further, a mounting hole 24A is formed in the attachment piece 34 in a penetrating manner in a vehicle front-rear direction.

Further, an outer wall 36 is formed integrally with outer ends of the upper wall portion 26 and an inclined portion 30 in the vehicle width direction. The outer wall 36 extends toward the vehicle rear side from the outer ends of the upper wall portion 26 and the inclined portion 30 in the vehicle width direction, which upper wall portion 26 and inclined portion 30 are placed on the vehicle front side relative to the mud guard portion 22, and the outer wall 36 is connected to an inner end, in the vehicle width direction, of an upper part of the mud guard portion 22. Hereby, the mud guard portion 22 and the inside flow regulating portion 24 are formed integrally via the outer wall 36.

Further, an opening portion between an upper end of the inside flow regulating portion 24 and the front wheel house 52 (the arch portion 54A) serves as an inlet portion 38, and the inlet portion 38 is opened toward the vehicle upper side. Furthermore, an opening portion between the rear end of the inside flow regulating portion 24 and the underfloor 58 serves as an outlet portion 40 (see FIG. 5), and the outlet portion 40 is opened toward the vehicle rear side. Hereby, a part inside the rear wheel house 12 communicates with a vehicle lower side part of the underfloor 18 via the space G.

Similarly to the first embodiment, when a travel wind flowing on an inner side of the front tire 56 in the vehicle width direction in the front wheel house 52 hits the inside flow regulating portion 24, the travel wind flows toward the vehicle rear side along the inside flow regulating portion 24 (a deflection wall portion 28 thereof).

Further, similarly to the first embodiment, in a case where a travel wind flowing into the front wheel house 52 flows diagonally downward toward the inner side in the vehicle width direction along a rear part of the front wheel house 52, the travel wind reaches the rear end of the front wheel house 52, and then flows into the space G from the inlet portion 38. A flow of the travel wind is deflected to a flow toward the vehicle rear side by the deflection wall portion 28 (the inclined portion 30 and the guide portion 32 thereof). Hereby, the inside flow regulating portion 24 restrains turbulence of the air on the vehicle rear side of the front tire 56 due to the travel wind flowing into the front wheel house 52.

Accordingly, even in the second embodiment, it is possible to obtain the same operation and effect as the first embodiment.

Further, in the second embodiment, a travel wind F3 (see an arrow F3 in FIG. 5) blowing down toward the vehicle lower side (a rear end side of the front wheel house 52) along the rear part of the front wheel house 52 (the arch portion 54A) in the front wheel house 52 flows into the space G from the inlet portion 38. Then, a flow of the travel wind F3 flowing into the space G is deflected to a flow toward the vehicle rear side by the deflection wall portion 28, and then, the travel wind F3 is discharged from the outlet portion 40 toward the vehicle rear side. Accordingly, the travel wind F3 can be effectively rectified toward the vehicle rear side, in regard to a vehicle in which the travel wind F3 relatively strongly blows down along the rear part of the front wheel house 52. Particularly, in the front wheel house 52, a relatively strong travel wind F3 is easy to occur, so the travel wind F3 can be rectified effectively.

Note that, in the second embodiment, the whole upper wall portion 26 of the inside flow regulating portion 24 is placed so as to be distanced from the rear end of the front wheel house 52 (the arch portion 54A) toward the vehicle front side, and the inlet portion 38 is formed between the upper wall portion 26 and the front wheel house 52. However, a configuration of the inlet portion 38 is not limited to this. For example, a vehicle lower side part of the upper wall portion 26 may be distanced from the rear end of the front wheel house 52 toward the vehicle front side, so as to form the inlet portion 38 between the vehicle lower side part of the upper wall portion 26 and the front wheel house 52 (the arch portion 54A). In this case, a vehicle upper side part of the upper wall portion 26 may be fixed to the arch portion 54A, and the vehicle lower side part of the upper wall portion 26 may be connected to the mud guard portion 22 via the outer wall 36.

Third Embodiment

Figure 6:
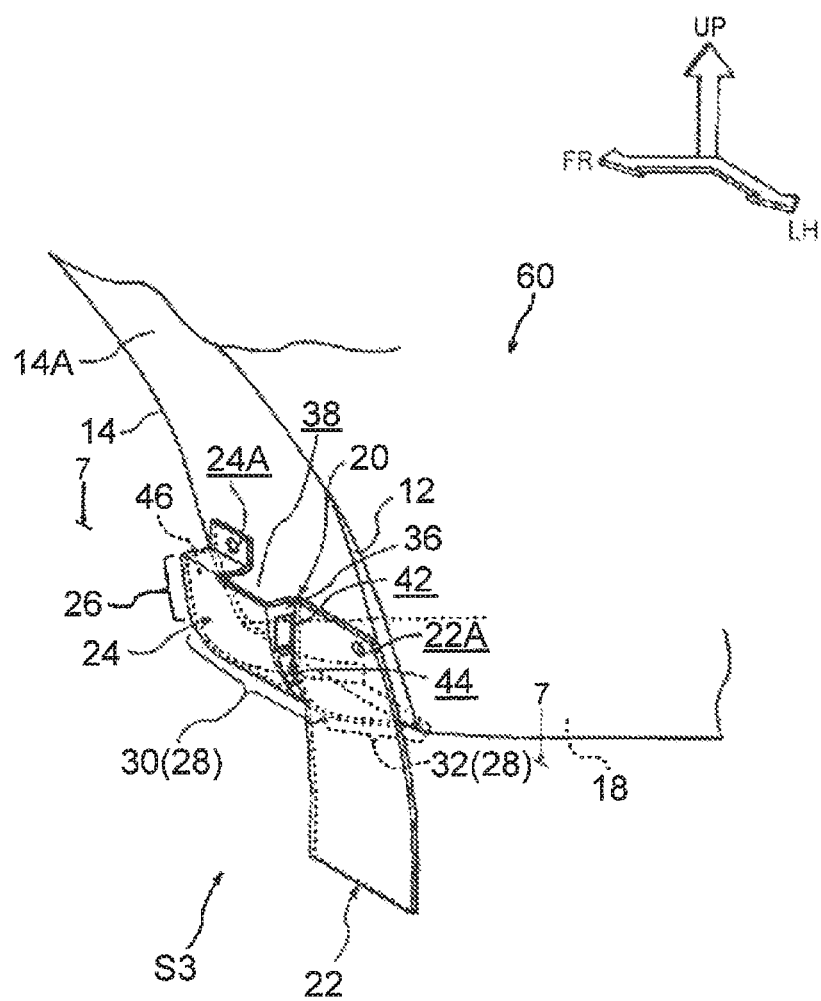
FIG. 6 is a schematic perspective view illustrating an essential part of a vehicle to which a vehicular mud guard structure according to a third embodiment is applied, when viewed from a diagonally forward left of the vehicle.
Figure 7:
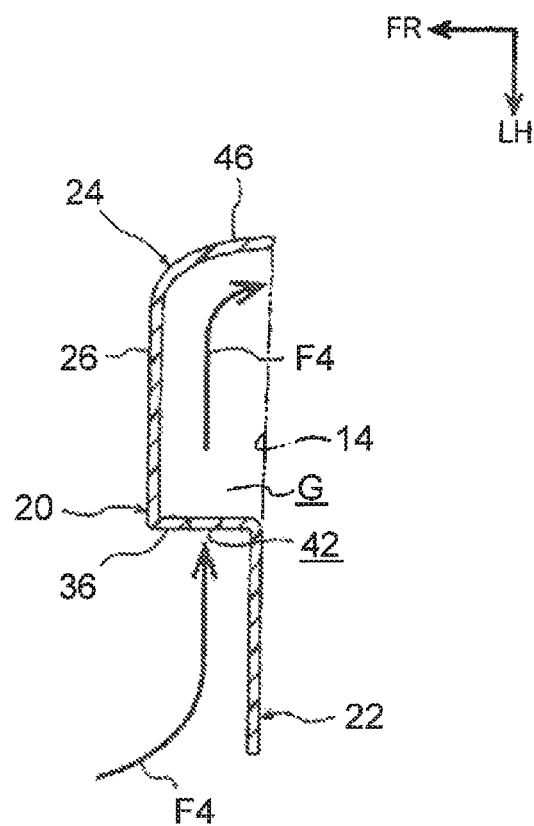
FIG. 7 is a schematic sectional view (a sectional view taken along a line 7-7 in FIG. 6) illustrating a mud guard illustrated in FIG. 6, when viewed from a vehicle upper side.

With reference to FIGS. 6, 7, the following describes a vehicle 60 to which a vehicular mud guard structure S3 according to a third embodiment is applied. The vehicular mud guard structure S3 is applied to a rear end of a rear wheel house 12 placed in a rear part of the vehicle 60, similarly to the first embodiment. Further, a mud guard 20 used in the third embodiment is configured in a similar manner to the second embodiment except the shape of the inside flow regulating portion 24 of the mud guard 20 in the second embodiment. The following describes the shape of the inside flow regulating portion 24. Note that the same reference sign is attached to a member configured in a similar manner to the first embodiment and the second embodiment.

In an inside flow regulating portion 24 in the third embodiment, two openings 42, 44 are formed in an outer wall 36 of the inside flow regulating portion 24 in a penetrating manner in a vehicle width direction. Hereby, a space G between the inside flow regulating portion 24 and a vehicle body communicates with a part inside a rear wheel house 12 via the openings 42, 44. Further, the openings 42, 44 form a generally rectangular shape in a side view, and aligned in a vehicle up-down direction, and a side, on a vehicle front side, of the opening 44 placed on a vehicle lower side is curved along an inclined portion 30 (see FIG. 6).

Further, as illustrated in FIG. 7, an inner wall 46 is formed integrally with an inner end of the inside flow regulating portion 24 in the vehicle width direction. The inner wall 46 is inclined in a curved shape (an arc shape) toward an inner side in the vehicle width direction as it goes toward the vehicle rear side, when viewed from a vehicle upper side.

Hereby, even in the third embodiment, it is possible to obtain the same operation and effect as the first embodiment and the second embodiment.

Further, in the third embodiment, as described above, two openings 42, 44 are formed in the outer wall 36 in a penetrating manner in the vehicle width direction, and the inner wall 46 is inclined in a curved shape (an arc shape) toward the inner side in the vehicle width direction as it goes toward the vehicle rear side.

Hereby, when a travel wind F4 flowing on an outer side of the vehicle 60 (a rear tire 16) in the vehicle width direction flows into the rear wheel house 12 from a vehicle rear side of the rear tire 16, for example, the travel wind F4 flows through the vehicle rear side of the rear tire 16 toward an inner side in the vehicle width direction, so as to flow into the space G from the openings 42, 44 (see an arrow F4 in FIG. 7). Then, a flow of the travel wind F4 flowing into the space G is deflected to a flow toward the vehicle rear side by the inner wall 46, and then, the travel wind F4 flows toward the vehicle rear side along a deflection wall portion 28 (an inclined portion 30 and a guide portion 32 thereof). Hereby, the travel wind F4 blowing into the rear wheel house 12 from the vehicle rear side of the rear tire 16 can be rectified effectively toward the vehicle rear side.

Note that, in the third embodiment, the inlet portion 38 that is opened toward the vehicle upper side is formed between an upper end of the inside flow regulating portion 24 and a fender liner 14, but a wall that closes the inlet portion 38 may be provided in the inside flow regulating portion 24. Further, in this case, the wall may be placed so as to smoothly connect an arch portion 14A of the fender liner 14 and an upper end of the inside flow regulating portion 24.

Further, in the third embodiment, two openings 42, 44 are formed in the outer wall 36, but the number of openings is not limited to this. For example, one opening may be formed, or three or more openings may be formed. Further, the outer wall 36 may be omitted, and a part opened outwardly in the vehicle width direction between the inside flow regulating portion 24 (the upper wall portion 26) and the rear wheel house 12 (the arch portion 14A) may serve as an opening.

Further, in the third embodiment, the inner wall 46 is inclined in a curved shape (an arc shape) toward the inner side in the vehicle width direction as it goes toward the vehicle rear side, when viewed from the vehicle upper side. Instead of this, the inner wall 46 may be formed to extend linearly from an inner end of the inside flow regulating portion 24 in the vehicle width direction toward the vehicle rear side, when viewed from the vehicle upper side. That is, the inner wall 46 may extend from the inner end of the inside flow regulating portion 24 in the vehicle width direction toward the vehicle rear side, such that the flow of the travel wind F4 flowing into the space G is deflected to the flow toward the vehicle rear side by the inner wall 46.

Further, in the second embodiment and the third embodiment, the mud guard portion 22 extends in the vehicle up-down direction of which plate-thickness direction extends along the vehicle front-rear direction. Instead of this, the vehicle lower side part of the mud guard portion 22 may be placed so as to be flush with the deflection wall portion 28 of the inside flow regulating portion 24, such that the mud guard portion 22 is formed integrally with the deflection wall portion 28.

Further, in the second embodiment, a wall corresponding to the inner wall 46 in the third embodiment is not formed in the inner end of the inside flow regulating portion 24 in the vehicle width direction. However, the inner wall 46 in the third embodiment may be formed in the inside flow regulating portion 24 in the second embodiment.

Fourth Embodiment

Figure 8:
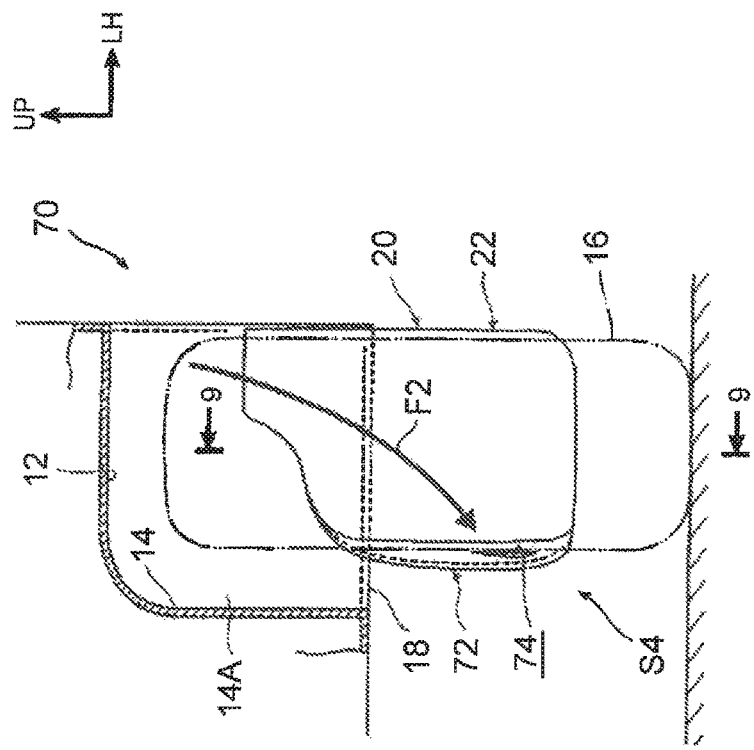
FIG. 8 is a schematic front view illustrating an essential part of a vehicle to which a vehicular mud guard structure according to a fourth embodiment is applied, and corresponds to FIG. 3.
Figure 9:
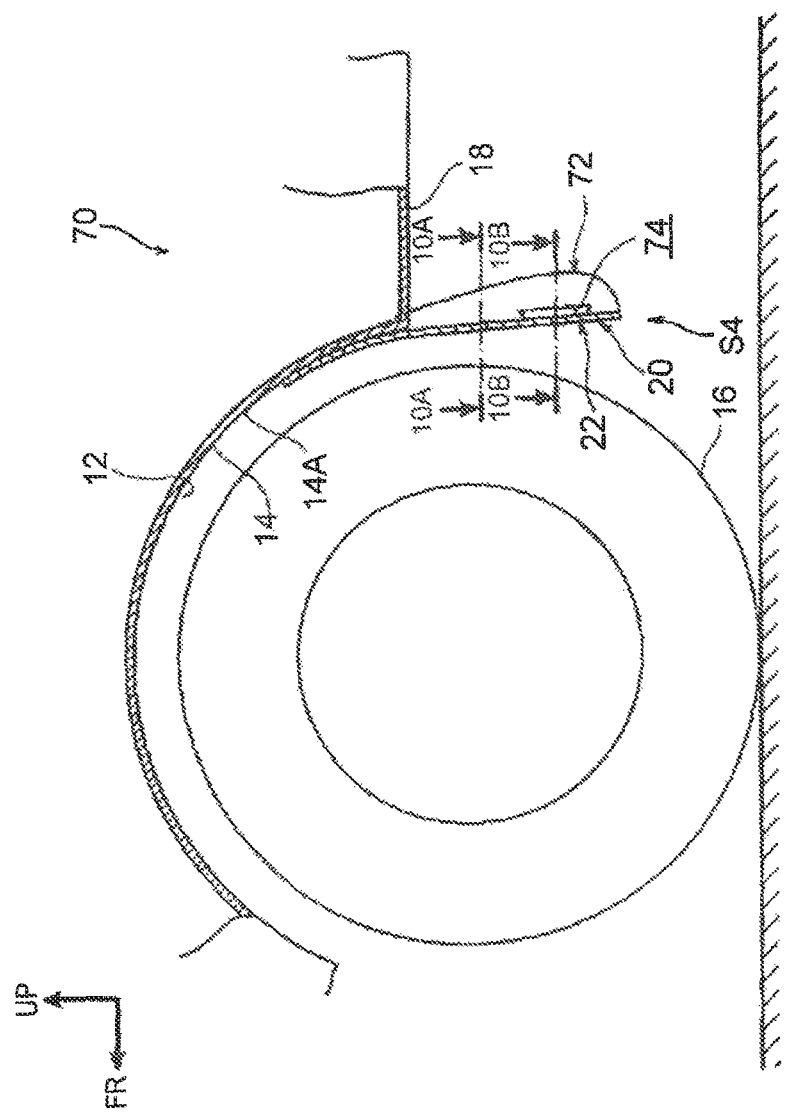
FIG. 9 is a schematic sectional view (a sectional view taken along a line 9-9 in FIG. 8) illustrating the essential part of the vehicle illustrated in FIG. 8 at a position of an inside flow regulating portion of a mud guard, when viewed from a vehicle left side.

With reference to FIGS. 8 to 10, the following describes a vehicle 70 to which a vehicular mud guard structure S4 according to a fourth embodiment is applied. The vehicular mud guard structure S4 is applied to a rear end of a rear wheel house 12 placed in a rear part of the vehicle 70, similarly to the first embodiment. Further, a mud guard 20 used in the fourth embodiment is configured in a similar manner to the mud guard 20 in the first embodiment except the following point. Note that the same reference sign is attached to a member configured in a similar manner to the first embodiment.

That is, the mud guard 20 of the fourth embodiment is not provided with the inside flow regulating portion 24. Further, an end flow regulating portion 72 is formed integrally with the mud guard 20, and the end flow regulating portion 72 extends from an inner part of the mud guard portion 22 in the vehicle width direction toward an inner side in the vehicle width direction and toward a vehicle rear side. More specifically, the end flow regulating portion 72 is inclined in a curved shape (an arc shape) toward the vehicle rear side as it goes toward the inner side in the vehicle width direction, when viewed from a vehicle upper side (see FIGS. 10A and 10B).

Further, a communicating hole 74 opened outwardly in the vehicle width direction is formed in a lower part of the end flow regulating portion 72. More specifically, that part of the end flow regulating portion 72 which corresponds to the communicating hole 74 protrudes toward the vehicle front side, such that the communicating hole 74 is formed. Hereby, a space A1 on a vehicle front side of the mud guard portion 22 communicates with a space A2 on a back side of the mud guard portion 22 (the end flow regulating portion 72) via the communicating hole 74 (see FIG. 10B).

Figure 10A:
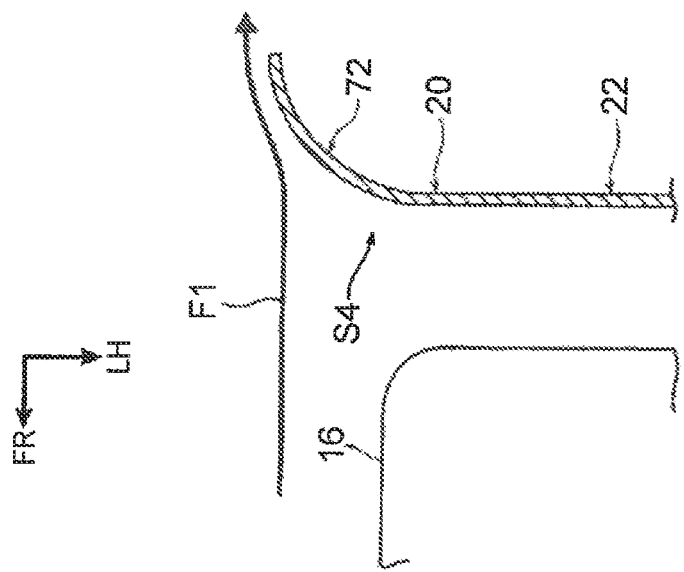
FIG. 10A is a schematic sectional view (a sectional view taken along a line 10A-10A in FIG. 9) illustrating the mud guard illustrated in FIG. 9, when viewed from a vehicle upper side.
Figure 10B:
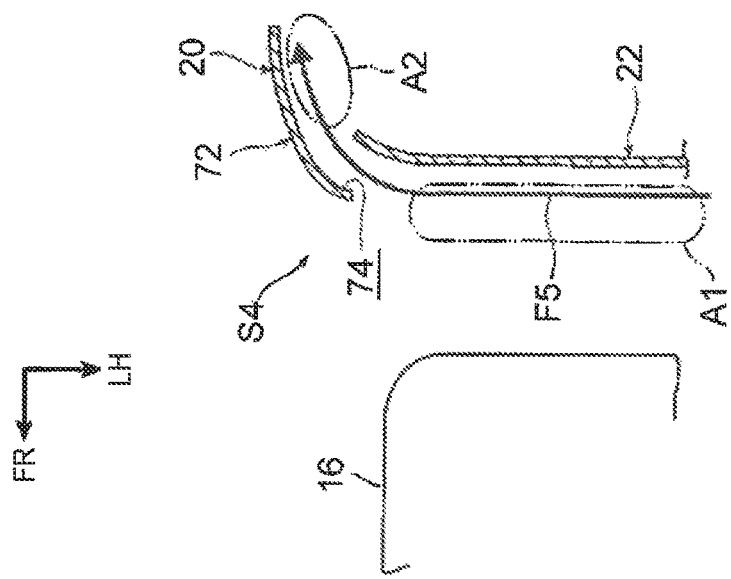
FIG. 10B is a schematic sectional view (a sectional view taken along a line 10B-10B in FIG. 9) illustrating the mud guard illustrated in FIG. 9, when viewed from the vehicle upper side.

Similarly to the first embodiment, during running of the vehicle 70, a travel wind F1 flowing on the inner side of the rear tire 16 in the vehicle width direction in the rear wheel house 12 flows toward the vehicle rear side along the end flow regulating portion 72 (see FIG. 10A). Hereby, the end flow regulating portion 72 restrains turbulence of the air on the vehicle rear side of the rear tire 16 due to the travel wind F1 flowing on the inner side of the rear tire 16 in the vehicle width direction.

Further, similarly to the first embodiment, when a travel wind F2 (see an arrow F2 in FIG. 8) flowing on the outer side of the vehicle 70 in the vehicle width direction flows into the rear wheel house 12, the travel wind F2 flows diagonally downward toward the inner side in the vehicle width direction along the rear part of the rear wheel house 12 (an arch portion 14A of a fender liner 14). Then, when the travel wind F2 flowing into the rear wheel house 12 reaches an inner end, in the vehicle width direction, of a lower end of the mud guard portion 22, the travel wind F2 flows toward the vehicle rear side along the end flow regulating portion 72. Hereby, the end flow regulating portion 72 restrains turbulence of the air on the vehicle rear side of the rear tire 16 due to the travel wind F2 flowing into the rear wheel house 12.

Accordingly, even in the fourth embodiment, it is possible to obtain the same operation and effect as the first embodiment.

Further, in the fourth embodiment, the communicating hole 74 opened outwardly in the vehicle width direction is formed in the end flow regulating portion 72, and the space A1 on the vehicle front side relative to the mud guard portion 22 communicates with the space A2 on the vehicle rear side relative to the mud guard portion 22 (the end flow regulating portion 72) via the communicating hole 74. Hereby, a travel wind F5 (see an arrow F5 in FIG. 10B) flowing toward the inner side in the vehicle width direction along a front face of the mud guard portion 22 at the time of turnaround of the vehicle 70 can be flowed toward the vehicle rear side effectively.

That is, if the communicating hole 74 is not provided in the end flow regulating portion 72, the travel wind F5 flowing toward the inner side in the vehicle width direction along the front face of the mud guard portion 22 at the time of turnaround of the vehicle 70 is detached from the end flow regulating portion 72, which may result in that the travel wind F5 may not flow toward the vehicle rear side well. In contrast, in the fourth embodiment, since the communicating hole 74 is formed in the end flow regulating portion 72, the travel wind F5 flows into the space A2 on the vehicle rear side (the back side) of the end flow regulating portion 72 through the communicating hole 74, such that the travel wind F5 flows toward the vehicle rear side along a rear face (a back surface) of the end flow regulating portion 72 (see FIG. 10B). This makes it possible to effectively flow, toward the vehicle rear side, the travel wind F5 flowing toward the inner side in the vehicle width direction along the front face of the mud guard portion 22 at the time of turnaround of the vehicle 70.

Fifth Embodiment

With reference to FIGS. 11 to 14A, the following describes a vehicle 80 to which a vehicular mud guard structure S5 according to a fifth embodiment is applied. The vehicular mud guard structure S5 is applied to a rear end of a front wheel house 52 placed in a front part of the vehicle 80, similarly to the second embodiment. Further, a mud guard 20 used in the fifth embodiment is configured in a similar manner to the mud guard 20 in the fourth embodiment except the following point.

That is, the mud guard 20 of the fifth embodiment is not provided with the communicating hole 74 in the end flow regulating portion 72 of the fourth embodiment. Further, a dimension of the end flow regulating portion 72 in the vehicle up-down direction is set smaller than a dimension, in the vehicle up-down direction, of the end flow regulating portion 72 in the fourth embodiment. Further, in the fourth embodiment, a rear end of the end flow regulating portion 72 is formed in an irregular shape in a side view (see FIGS. 12 and 14A). That is, a rear end of the end flow regulating portion 72 is provided integrally with a plurality of convex portions 82 (four convex portions in the present embodiment) and a plurality of concave portions 84 (three concave portions in the present embodiment).

Further, similarly to the second embodiment, during running of the vehicle 80, a travel wind flowing on an inner side of the front tire 56 in the vehicle width direction in the front wheel house 52 toward a vehicle rear side flows toward the vehicle rear side along the end flow regulating portion 72.

Further, similarly to the second embodiment, in a case where a travel wind flowing into the front wheel house 52 flows diagonally downward toward the inner side in the vehicle width direction along a rear part of the front wheel house 52, the travel wind reaches an inner end, in the vehicle width direction, of a lower end of the mud guard portion 22, so as to flow toward the vehicle rear side along the end flow regulating portion 72. Hereby, the end flow regulating portion 72 can restrain turbulence of the air on the vehicle rear side of the front tire 56 due to the travel wind flowing into the front wheel house 52.

Accordingly, even in the fifth embodiment, it is possible to obtain the same operation and effect as the second embodiment.

Further, in the fifth embodiment, a rear end of the end flow regulating portion 72 is formed in an irregular shape in a side view. That is, the rear end of the end flow regulating portion 72 is provided with the plurality of convex portions 82 and concave portions 84. Hereby, when a travel wind F6 (see an arrow F6 in FIG. 13) flowing diagonally rearward toward an outer side in the vehicle width direction in a space A3 (see FIG. 13) on an inner side relative to the end flow regulating portion 72 in the vehicle width direction occurs, it is possible to restrain the travel wind F6 from going around a back side of the end flow regulating portion 72 (the mud guard 20).

Figure 13:
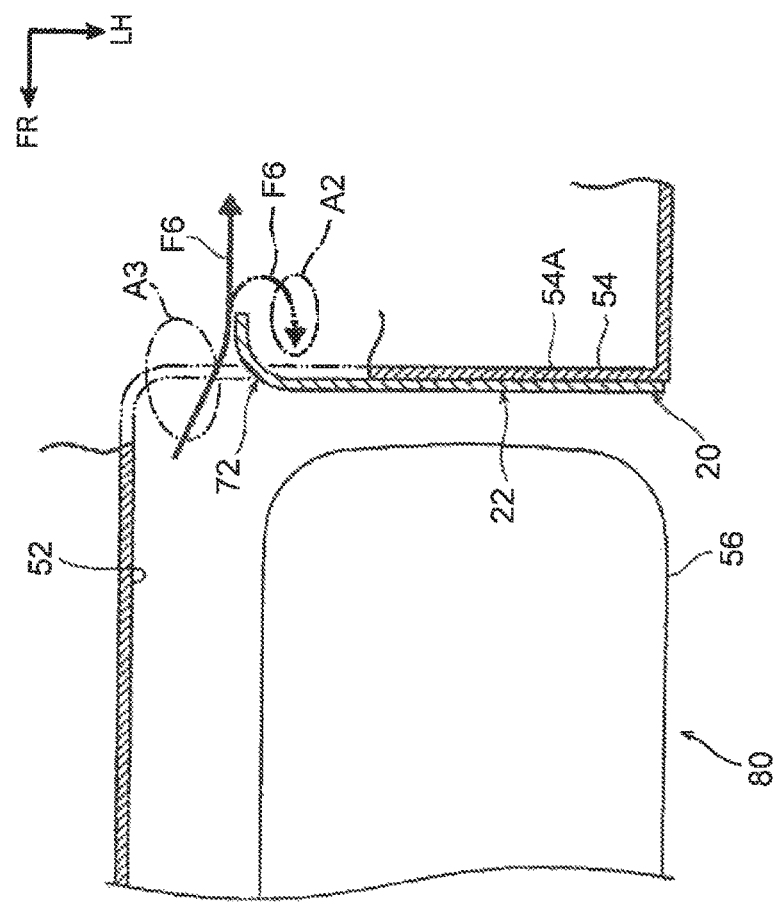
FIG. 13 is a schematic sectional view (a sectional view taken along a line 13-13 in FIG. 12) illustrating the mud guard illustrated in FIG. 12, when viewed from a vehicle upper side.

That is, in a space around the end flow regulating portion 72 during running of the vehicle 80, a pressure in the space A3 on a front side of the end flow regulating portion is higher than a pressure of a space A2 on the back side of the end flow regulating portion 72 (see FIG. 13). Because of this, the air on the front side of the end flow regulating portion 72 is going to flow into the space A2 on the back side of the end flow regulating portion 72 through the concave portions 84 and the convex portions 82 of the end flow regulating portion 72. More specifically, the air on the front side of the end flow regulating portion 72 is going to flow into the space A2 on the back side of the end flow regulating portion 72 so as to go around inclined parts of the convex portions 82 of the end flow regulating portion 72 (see arrows F7 in FIG. 14A). Hereby, small swirl flows F7 are caused around the rear end of the end flow regulating portion 72. Then, a flow (see an arrow F6 indicated by a two-dot chain line in FIG. 13) of the travel wind F6 that is going around from the space A3 on the front side of the end flow regulating portion 72 to the space A2 on the back side of the end flow regulating portion 72 is restrained by the swirl flows F7, such that the travel wind F6 flows toward the vehicle rear side (see an arrow F6 indicated by a continuous line in FIG. 13). This makes it possible to restrain the travel wind F6 from going around the back side of the end flow regulating portion 72.

Note that, in the fifth embodiment, in order to restrain the travel wind F6 from going around the back side of the end flow regulating portion 72, the rear end of the end flow regulating portion 72 is formed in an irregular shape in a side view. However, means for restraining the travel wind F6 from going around the back side of the end flow regulating portion 72 is not limited to this.

Figure 14A:
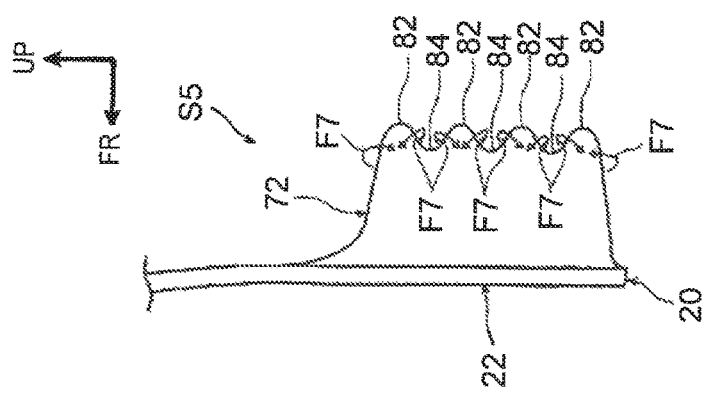
FIG. 14A is a side view illustrating an end flow regulating portion illustrated in FIG. 13, when viewed from the vehicle left side.
Figure 14B:
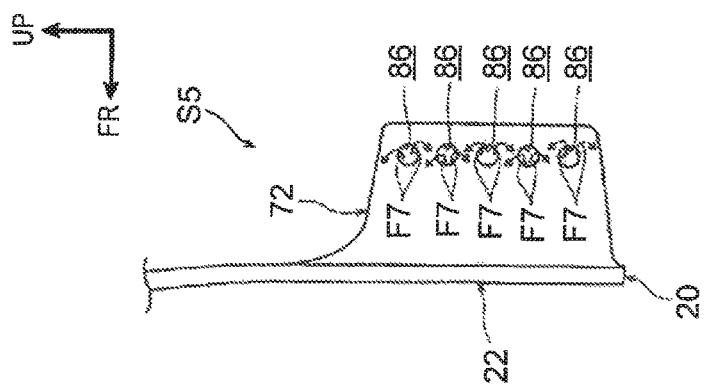
FIG. 14B is a side view illustrating a modification of the end flow regulating portion illustrated in FIG. 14A.

For example, as illustrated in FIG. 14B, a plurality of hole portions 86 penetrating through the end flow regulating portion 72 in its plate-thickness direction may be formed in the rear end of the end flow regulating portion 72. Even in this case, the air on the front side of the end flow regulating portion 72 is going to flow into the space A2 on the back side of the end flow regulating portion 72 through the hole portions 86. More specifically, the air on the front side of the end flow regulating portion 72 is going to flow into the space A2 on the back side of the end flow regulating portion 72 so as to go around inner peripheral surfaces of the hole portions 86 of the end flow regulating portion 72 (see arrows F7 in FIG. 14B). Hereby, small swirl flows F7 are caused around the rear end of the end flow regulating portion 72, similarly to the above. Accordingly, the flow of the travel wind F6 that is going around from the space A3 on the front side of the end flow regulating portion 72 toward the space A2 on the back side of the end flow regulating portion 72 can be restrained by the swirl flows F7.

Figure 15:
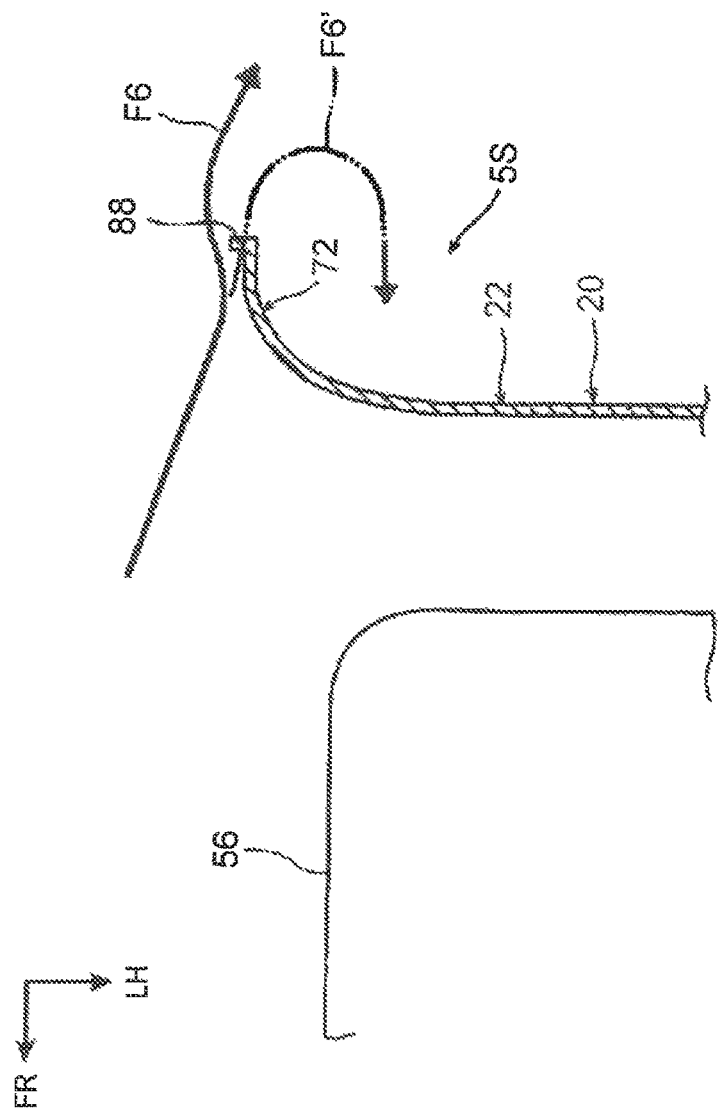
FIG. 15 is a schematic sectional view illustrating another modification of the end flow regulating portion illustrated in FIG. 13, when viewed from the vehicle upper side.

Further, as illustrated in FIG. 15, a projection portion 88 projecting inwardly in the vehicle width direction and extending in the vehicle up-down direction along the rear end of the end flow regulating portion 72 may be formed in the rear end of the end flow regulating portion 72. In this case, the travel wind F6 hits the projection portion 88, such that an orientation of the travel wind F6 is changed toward an inner side of the projection portion 88 in the vehicle width direction, and the travel wind F6 flows toward the vehicle rear side (see an arrow F6 indicated by a continuous line in FIG. 15). This makes it possible to restrain the travel wind F6 from going around as indicated by a two-dot chain line in FIG. 15.

Sixth Embodiment

Figure 16:
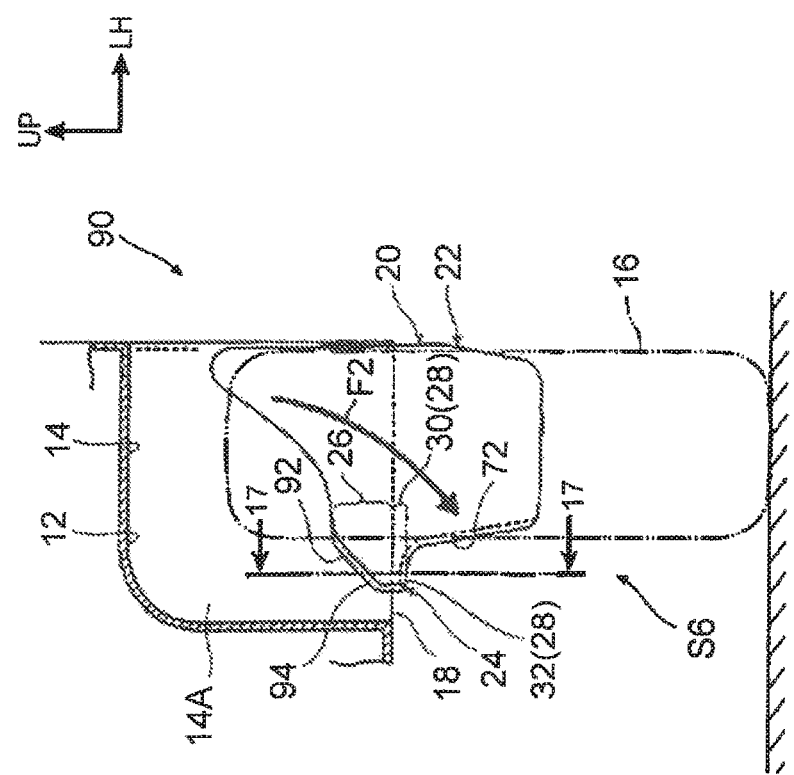
FIG. 16 is a schematic front view illustrating an essential part of a vehicle to which a vehicular mud guard structure according to a sixth embodiment is applied, and corresponds to FIG. 3.
Figure 17:
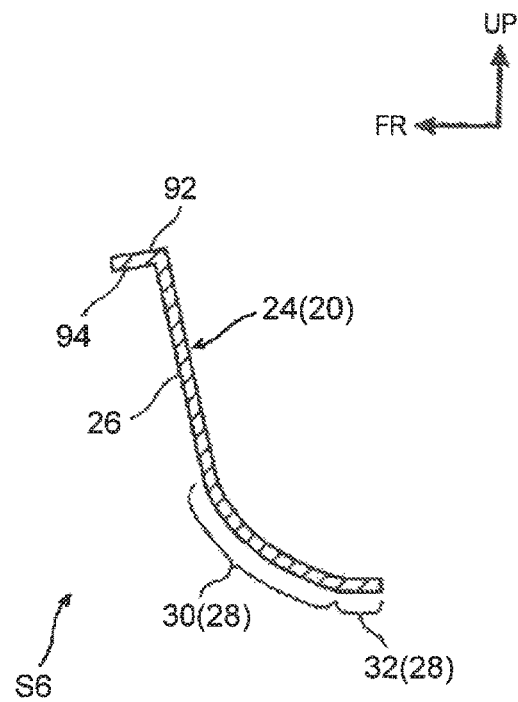
FIG. 17 is a schematic sectional view (a sectional view taken along a line 17-17 in FIG. 16) illustrating an inside flow regulating portion illustrated in FIG. 16, when viewed from a vehicle left side.

With reference to FIGS. 16 and 17, the following describes a vehicle 90 to which a vehicular mud guard structure S6 according to a sixth embodiment is applied. The vehicular mud guard structure S6 is applied to a rear end of a rear wheel house 12 placed in a rear part of the vehicle 90, similarly to the first embodiment. Further, a mud guard 20 used in the sixth embodiment has a configuration in combination with the mud guard 20 of the first embodiment and the mud guard 20 of the fourth embodiment. That is, in the sixth embodiment, the mud guard 20 is provided with an inside flow regulating portion 24 and an end flow regulating portion 72.

More specifically, a deflection wall portion 28 of the inside flow regulating portion 24 is formed integrally with the end flow regulating portion 72. Further, a coupling portion between an outer end of the deflection wall portion 28 in the vehicle width direction and an upper end of the end flow regulating portion 72 is formed in an arc shape when viewed from a vehicle front side, such that the deflection wall portion 28 is smoothly connected to the end flow regulating portion 72. Further, the inside flow regulating portion 24 is placed on an inner side of a rear tire 16 in the vehicle width direction.

Further, an inclined portion 92 is formed at a corner portion on an inner side, in the vehicle width direction, of an upper wall portion 26 of the inside flow regulating portion 24, and the inclined portion 92 is inclined toward the inner side in the vehicle width direction as it goes toward a vehicle lower side, when viewed from a vehicle front side. Further, a guide wall 94 projecting toward the vehicle front side is formed integrally with the upper wall portion 26, on a vehicle upper side relative to the deflection wall portion 28 (see FIG. 17). The guide wall 94 is inclined inwardly in the vehicle width direction as it goes toward the vehicle lower side along the inclined portion 92, when viewed from the vehicle front side, and a lower end of the guide wall 94 is bent toward the vehicle lower side.

Although not illustrated herein, similarly to the first embodiment, during running of the vehicle 90, a travel wind F1 flowing on the inner side of the rear tire 16 in the vehicle width direction in the rear wheel house 12 flows toward the vehicle rear side along the inside flow regulating portion 24 and the end flow regulating portion 72. Hereby, the inside flow regulating portion 24 and the end flow regulating portion 72 restrain turbulence of the air on the vehicle rear side of the rear tire 16 due to the travel wind F1 flowing on the inner side of the rear tire 16 in the vehicle width direction.

Further, similarly to the first embodiment, when a travel wind F2 (see an arrow F2 in FIG. 16) flowing on an outer side of the vehicle 90 in the vehicle width direction flows into the rear wheel house 12, the travel wind F2 flows diagonally downward toward the inner side in the vehicle width direction along the rear part of the rear wheel house 12 (an arch portion 14A of a fender liner 14). Then, the travel wind F2 flowing into the rear wheel house 12 flows toward the vehicle rear side along the inside flow regulating portion 24 and the end flow regulating portion 72. Hereby, the inside flow regulating portion 24 and the end flow regulating portion 72 restrain turbulence of the air on the vehicle rear side of the rear tire 16 due to the travel wind F2 flowing into the rear wheel house 12.

Accordingly, even in the sixth embodiment, it is possible to obtain the same operation and effect as the first embodiment.

Further, in the sixth embodiment, the guide wall 94 projecting toward the vehicle front side is formed integrally with the upper wall portion 26 of the inside flow regulating portion 24. The guide wall 94 is inclined inwardly in the vehicle width direction as it goes toward the vehicle lower side along the inclined portion 92, when viewed from the vehicle front side, and the lower end of the guide wall 94 is bent toward the vehicle lower side.

This allows the guide wall 94 to successfully flow (change a direction), toward the deflection wall portion 28, the travel wind F2 flowing diagonally downward toward the inner side in the vehicle width direction along the rear part of the rear wheel house 12 (the arch portion 14A of the fender liner 14).

Figure 18A:
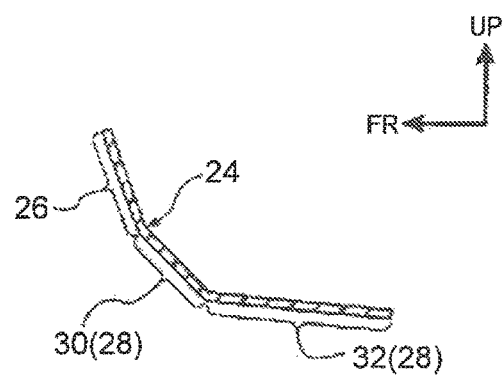
FIG. 18A is a sectional side view illustrating a modification of an inclined portion of the mud guard used in the first embodiment to the third embodiment, and the sixth embodiment.

Note that, in the first embodiment to the third embodiment and the sixth embodiment, the inclined portion 30 of the inside flow regulating portion 24 is inclined in a curved shape (an arc shape) toward the vehicle lower side as it goes toward the vehicle rear side in a side view. However, the shape of the inclined portion 30 is not limited to this. For example, as illustrated in FIG. 18A, the inclined portion 30 may be inclined linearly toward the vehicle lower side as it goes toward the vehicle rear side in a side view. Further, the inclined portion 30 may be constituted by divided inclined portions. In this case, as illustrated in FIG. 18B, for example, a first inclined portion 30A constituting an upper part of the inclined portion 30 may be inclined toward the vehicle front side as it goes toward the vehicle lower side in a side view, and a second inclined portion 30B constituting a lower part of the inclined portion 30 may be inclined in a curved shape (an arc shape) toward the vehicle lower side as it goes toward the vehicle rear side in a side view. Further, in the second embodiment and the third embodiment, the inclined portion 30 of the inside flow regulating portion 24 may be omitted, and a front end of the guide portion 32 of the deflection wall portion 28 may be connected to a lower end of the upper wall portion 26. That is, the inside flow regulating portion 24 may extend toward the vehicle lower side and toward the vehicle rear side such that a rear end of the deflection wall portion 28 is placed on the vehicle rear side relative to the upper wall portion 26.

Further, in the first embodiment to the third embodiment, and the sixth embodiment, the deflection wall portion 28 is constituted by including the inclined portion 30 and the guide portion 32. However, the guide portion 32 may be omitted in the deflection wall portion 28. This will be described with reference to the first embodiment, for example. That is, as illustrated in FIGS. 19A and 19B, the inclined portion 30 may be configured to be inclined linearly in a side view and to be connected to the mud guard portion 22.

Further, in the first embodiment to the third embodiment, and the sixth embodiment, a member such as a frame constituting a vehicle body may be placed between the guide portion 32 of the inside flow regulating portion 24 and the underfloor 18, 58. Hereby, the inside flow regulating portion 24 can restrain turbulence of the air due to the member.

Further, in the first embodiment to the third embodiment, when viewed from the vehicle front side, the inside flow regulating portion 24 is placed such that its outer part in the vehicle width direction overlaps with the rear tire 16 (the front tire 56). However, the inside flow regulating portion 24 can be set to any position. For example, the inside flow regulating portion 24 may be placed on the inner side in the vehicle width direction relative to the rear tire 16 (the front tire 56).

Moreover, in the first embodiment, the third embodiment, and the sixth embodiment, the vehicular mud guard structure S1, S3 is applied to the rear end of the rear wheel house 12. However, the vehicular mud guard structure S1, S3 may be applied to the rear end of the front wheel house 52. Further, in the second embodiment, the vehicular mud guard structure S2 is applied to the rear end of the front wheel house 52. However, the vehicular mud guard structure S2 may be applied to the rear end of the rear wheel house 12.

Further, in the first embodiment to the third embodiment, and the sixth embodiment, the mud guard portion 22 is formed integrally with the inside flow regulating portion 24, but the mud guard portion 22 may be formed separately from the inside flow regulating portion 24.

The invention claimed is:

1. A vehicular mud guard structure comprising:
    a mud guard portion provided in a rear end of a wheel house in which a wheel assembly is placed, the mud guard portion having a plate shape such that a width direction of the mud guard portion extends along a vehicle width direction, the mud guard portion having a lower end that projects toward a vehicle lower side and that extends below an underfloor on a vehicle rear side of the wheel house; and
    an end flow regulating portion extending from an inner part of the mud guard portion in the vehicle width direction toward the vehicle rear side from the mud guard portion, the end flow regulating portion being curved and inclined towards the vehicle rear side as the end flow regulating portion extends towards an inner side in the vehicle width direction, wherein:
    the end flow regulating portion has a plate shape; and
    a rear end of the end flow regulating portion is provided with a hole portion that penetrates the end flow regulating portion in a plate-thickness direction of the end flow regulating portion.

2. The vehicular mud guard structure according to claim 1, wherein the rear end of the end flow regulating portion is provided with a plurality of convex portions and a plurality of concave portions.

3. The vehicular mud guard structure according to claim 1, further comprising:
    a projection portion projecting inwardly in the vehicle width direction is formed in the rear end of the end flow regulating portion.

* * * * *